: 2,699,376
Patented Jan. 11, 1955

UNITED STATES PATENT OFFICE 2,699,376

PROCESS FOR INCREASING THE AVERAGE PORE SIZE OF A CALCINED SILICA GEL

Russell G. Hay, Penn Township, Allegheny County, Pa., assignor to Gulf Research & Development Company, Pittsburgh, Pa., a corporation of Delaware No Drawing. Application August 1, 1950,
Serial No. 177,121

4 Claims. (Cl. 23—182)

This invention relates to a process of treating calcined silica gels to accomplish desirable alteration of the surface characteristics of the gels.

Silica gels are widely used in industry for a variety of purposes where advantage can be taken of the surface area characteristics of these materials. As is well known, silica gel prepared by conventional methods has a high surface area, for example, a surface area ranging from about 400 to about 800 square meters per gram, the surface area varying depending upon the method by which the gel is prepared. Silica gels are useful as adsorbents, catalyst supports, and the like and it is usually the case that the optimum surface area for one purpose is not optimum for another. A silica gel having a high surface area, which includes the surface areas of the myriad of pores with which the gel is interlaced, is one in which the average pore diameter is relatively low. In cases where the silica gel is to be employed for a purpose wherein the material to be adsorbed or deposited is one which can readily enter narrow pores, a high surface area, low pore diameter gel is desirable. However, in many cases it is desirable to adsorb or deposit on the silica gel a material incapable of entering the narrower pores of a high surface area gel and in such situations the better gel is one having a lower total surface area and larger pores.

Silica gels can be prepared by a number of methods. Conventional methods involve the acidifying of an alkali metal silicate solution to form the wet gel containing water of formation, removing alkali metal by washing the wet gel with water or water containing a vaporizable acidic substance, drying at a relatively low temperature such as a temperature within the range of 212° to 350° F., and then calcining by heating the partially dried gel at a temperature within the range of 700° to 1300° F. or higher. In some cases the alkali metal is removed from the partially dried gel rather than the wet gel, as by washing the partially dried gel with a solution of an ammonium salt such as ammonium chloride. Any ammonia remaining in the gel is removed in the final calcining step. Calcining is an essential part of methods for making silica gels as it serves to fix the chemical and physical properties of the gels.

In view of the desirability, and in many cases the necessity, of providing silica gels having selected surface characteristics, methods of preparing such gels have been devised whereby the final products have the desired surface area characteristics. Thus, it is known that the pH conditions existing at the time of precipitation of the gel have an effect on the surface area and average pore diameter of the final dried and calcined product. It is also known that the surface characteristics of a final gel can be affected by washing the undried gel with an aqueous solution of selected pH value, and by washing with water heated to a selected temperature.

These methods of producing silica gels of varying surface characteristics have the disadvantage that they can only be applied to the gels before removing the water of formation. Accordingly, once a quantity of a calcined gel is prepared having selected surface characteristics and it is desired to alter the surface characteristics, these methods offer no solution to the problem.

The present invention is concerned with a process for the treatment of calcined silica gels to alter the surface characteristics of the gels in the direction of increased average pore diameter and lower surface area. Thus, by practice of the process of the invention, it is possible to alter the surface characteristics of a silica gel previously considered a finished material and adapt the gel for a desired purpose. For example, a silica gel can be prepared having a maximum surface area and narrow pores and yet be employed for a variety of uses since portions of it can be so treated as to have different characteristics.

I have discovered in accordance with the invention that by immersing a calcined silica gel in an aqueous solution of an ammonium hydroxide and then removing the hydroxide from the surface of the gel, the average diameter of the pores of the gel is increased and the surface area decreased. The ammonium hydroxide can be ammonium hydroxide itself or a substituted ammonium hydroxide. The process is carried out by immersing the calcined gel in an aqueous solution of ammonium hydroxide, permitting the gel to remain in contact with the solution for a period of time adapted to cause the desired change in the surface characteristics of the gel, separating the gel from the solution and then removing the ammonium hydroxide from the surface of the gel.

I have found that effective results can be obtained at ordinary atmospheric temperature and therefore such temperature is preferably used. However, higher temperatures such as temperatures up to about 325° F. can be employed if it is desired to shorten the time of treatment. Also, by the use of higher temperatures the same effect can be obtained with a weak solution of ammonium hydroxide as with a strong solution at atmospheric temperature. In carrying out the process, ammonium hydroxide solutions of various concentrations can be used. When using a strong solution, the desired results can be obtained in a shorter period of time than when more dilute solutions are employed.

The removal of the ammonium hydroxide from the calcined gel following the ammonium hydroxide treatment can be accomplished in various ways. It is important that once the surface characteristics of the gel have been altered to the desired extent, no ammonium hydroxide be permitted to remain in contact with the gel since the hydroxide will continue to affect the gel area. The removal can be accomplished by washing the gel several times with water until no ammonia appears in the wash water. The resulting wet material is then dried and may be subjected to a final calcination. The removal of the ammonium hydroxide can also be accomplished by drying the gel containing the ammonium hydroxide solution at a relatively low temperature, for example, a temperature of about 212° to about 350° F., and then calcining the dry gel if desired. Where it is desired to avoid any substantial changing of the gel during drying, the drying should be carried out under vacuum. Calcination is effectively accomplished by heating the gel at a temperature of about 700° to 1300° F. for a period of one or more hours; for example, about 2 to 20 hours.

In order that the invention may be understood more fully, reference should be had to the following specific example which is concerned with the treatment of a typical calcined silica gel. This gel was a granular material which was substantially free of alkali metals. One portion, identified as gel A, was not treated, and two other portions, identified as gels B and C, were subjected to treatment with an aqueous solution of ammonium hydroxide as described below. The gel was immersed in a 1 N solution of NH4OH at atmospheric temperature and retained in the solution for the period of time given in the following table. The gel was then removed from the solution, drained of excess NH4OH, and dried over a boiling water bath (temperature 212° F.) while evacuating. When no ammonia was being evolved and the gel was dry and free of ammonia, the drying was stopped. The surface area in square meters per gram, and the adsorption isotherm of each of gels A, B and C were then determined and the average pore diameter of each was calculated from the isotherm. The results are given in the following table.

| Gel | Time of NH$_4$OH Treatment (Hours) | Surface Area, Sq. M./Gm. | Average Pore Diameter, A° |
|---|---|---|---|
| Gel A | None | 746 | 21.6 |
| Gel B | 4 | 578 | 30.4 |
| Gel C | 24 | 458 | 38.4 |

It will be seen from these results that the total surface area is decreased and the average pore diameter increased by the treatment described.

In other treatments of silica gel similar to those described above, it was found important in order to reproduce results to remove the ammonium hydroxide to the same extent in each case and to use the same drying technique. The activity of the ammonium hydroxide in altering the surface characteristics of silica gel is increased with rise in temperature and therefore the action of the hydroxide during drying must be taken into account.

In place of the aqueous solution of ammonium hydroxide employed in the above examples, there may be used an aqueous solution of a water-soluble substituted ammonium hydroxide, such as a hydroxide of a primary, secondary or tertiary amine, or a quaternary ammonium hydroxide. It is preferred to employ substituted ammonium hydroxides of this class in which the substituents are lower alkyl groups, such as alkyl groups containing not more than six carbon atoms. As examples of such compounds there may be mentioned mono-, di-, tri-, and tetra-methyl, ethyl, propyl or butyl ammonium hydroxide. It will be understood that the N-substituents in these compounds need not be identical as such compounds as methyl-ethyl ammonium hydroxide, and ethyl-butyl ammonium hydroxide can be used.

The description has stressed that the silica gels with which the invention is concerned are calcined materials. This is important since prior to the time a silica gel is calcined, it contains some water of formation and is more or less unstable and even in the absence of specific treatment, it is subject to changes. Since the present process is designed to effect controlled alterations in the surface characteristics in the gel subjected to treatment, it is important that the gel have fixed chemical and physical characteristics. Calcination involves heating the material to a high temperature, for example, a temperature of at least 700° F., ordinarily a temperature within the range of 800° to 1300° F. for a time sufficient to fix the characteristics of the gel, usually a period of from 15 minutes to 20 or more hours, depending upon the temperature and the specific characteristics of the gel.

Those skilled in the art will recognize from the foregoing description that the time of contact between the ammonium hydroxide and the silica gel can be varied widely depending upon the degree of alteration desired, the concentration of the ammonium hydroxide solution, and the temperature and the specific nature of the silica gel subjected to treatment. Therefore, it is not possible to state a time range which would be optimum for all applications of the process. For example, when using elevated temperatures, alteration of the surface characteristics of the gel can be obtained in a few seconds. On the other hand, under mild conditions of operation, the gel can remain immersed in the ammonium hydroxide solution for one or more hours.

Obviously many modifications and variations of the invention, as hereinbefore set forth, may be made without departing from the spirit or scope thereof and therefore only such limitations should be imposed as are indicated in the appended claims.

I claim:

1. A process for increasing the average pore size of a silica gel which has been calcined at a temperature of about 700° to 1300° F. comprising contacting the calcined silica gel with an aqueous solution of ammonium hydroxide at a temperature below about 325° F. until substantially the desired increase in the average size of the pores of the gel has been acomplished, and immediately thereafter removing the ammonium hydroxide from the thus treated gel.

2. A process for increasing the average pore size of a calcined silica gel which has been heated to a temperature of about 700° to 1300° F. comprising contacting the calcined silica gel with an aqueous solution of ammonium hydroxide at a temperature below about 325° F. until substantially the desired increase in the average size of the pores of the gel has been accomplished, and immediately thereafter washing the thus treated gel to remove ammonium hydroxide therefrom.

3. A process for increasing the average pore size of a calcined silica gel which has been heated to a temperature of about 700° to 1300° F. comprising contacting the calcined silica gel with an aqueous solution of ammonium hydroxide at a temperature below about 325° F. until substantially the desired increase in the average size of the pores of the silica gel has been accomplished, and immediately thereafter drying the thus treated gel to evaporate ammonium hydroxide therefrom.

4. A process for increasing the average pore size of a calcined silica gel which has been heated to a temperature of about 700° to 1300° F. comprising contacting the calcined silica gel with an aqueous solution of ammonium hydroxide at a temperature below about 325° F. until substantially the desired increase in the average size of the pores of the silica gel has been acomplished, and immediately thereafter drying the gel under vacuum whereupon the ammonium hydroxide is evaporated therefrom.

References Cited in the file of this patent

UNITED STATES PATENTS

| | | |
|---|---|---|
| 1,665,264 | Holmes | Apr. 10, 1928 |
| 1,878,108 | Carstens et al. | Sept. 20, 1932 |
| 2,477,695 | Kimberlin | Aug. 2, 1949 |
| 2,484,258 | Webb et al. | Oct. 11, 1949 |

OTHER REFERENCES

Hackh: Chemical Dictionary, 3rd, ed., The Blakiston Co., Phila., 1944, page 156.

Markov et al.: C. A. 31, 1937, page 6950.